April 28, 1931.     H. F. DEUTSCHER ET AL     1,802,409
LOADING DEVICE FOR AUTOMOBILE VEHICLES
Filed Sept. 9, 1929     2 Sheets-Sheet 1

INVENTORS
H. F. DEUTSCHER AND J. C. BOLTON
by
ATTY.

April 28, 1931.  H. F. DEUTSCHER ET AL  1,802,409
LOADING DEVICE FOR AUTOMOBILE VEHICLES
Filed Sept. 9, 1929   2 Sheets-Sheet 2

INVENTORS
H. F. DEUTSCHER
AND J. C. BOLTON
by
ATTY.

Patented Apr. 28, 1931

1,802,409

UNITED STATES PATENT OFFICE

HENRY FREDERICK DEUTSCHER, OF BALLARAT, AND JOHN CHAPMAN BOLTON, OF KELLALAC, VICTORIA, AUSTRALIA

LOADING DEVICE FOR AUTOMOBILE VEHICLES

Application filed September 9, 1929, Serial No. 391,470, and in Australia September 24, 1928.

This invention relates to loading apparatus particularly suitable for loading bagged wheat and other materials from the ground onto automobile trucks.

The primary object of the invention is to provide a loading device adapted for application to a motor vehicle and to be actuated by the engine thereof, whereby loads, such as bags of wheat and the like, may be readily placed upon the loader and elevated thereby into the vehicle in a quick, reliable and efficient manner so that the time and cost of loading operations will be considerably reduced.

Apparatus in accordance with the invention includes a swinging loading frame which is adapted to be applied to a vehicle in a convenient position and normally extends to the ground, so that bags to be loaded may be readily placed thereon. Mechanism adapted to be actuated by the vehicle engine is provided to swing the frame with a bag thereon upwardly through a certain arc, whereupon the frame is automatically released from the engine or power operated mechanism, so that the bag is delivered into the body of the vehicle, and the frame returns by gravity to a load receiving position. Provision is also preferably made whereby the placing of a bag onto the frame automatically connects the power operated mechanism with the frame, so that the attention and labour required for the loading device is reduced to a minimum.

Referring to the drawings which form part of this specification:—

Figure 1:
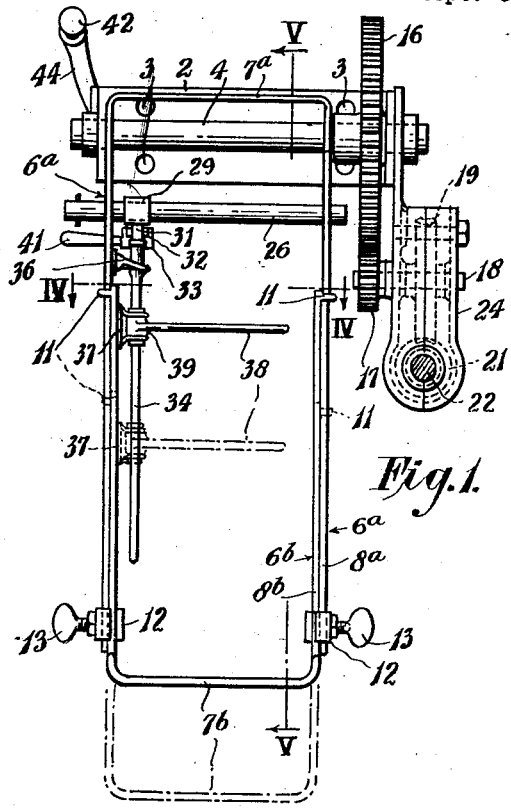
Figure 1 is a front view of a mechanical loader according to the invention.

Apparatus in accordance with the invention includes a suitable bracket or mounting member 2 for supporting the various parts, this bracket being suitably adapted, as at 3, for attachment to a convenient part of the vehicle with which the apparatus is to be used.

A shaft or axle 4 may be rotatably supported by the bracket 2 so as to provide an axis for a swinging or loading frame which may be freely mounted to turn about said axle. The swinging frame is preferably telescopic in a longitudinal direction, so that its length may be adjusted to enable the bottom of the frame to rest on the ground (as in Figure 6) for receiving a bag, and to enable it to lift bags to any desired height. The said frame may consist of two sections 6a, 6b, of substantially U shape and assembled with their respective transverse portions 7a, 7b, remote from each other and with the side legs 8a of one frame section contiguous to the side legs 8b of the other frame section, as illustrated. To keep the frame sections in proper relative alignment whilst permitting of telescopic movement the legs of one of the sections may be provided with guide loops or eyelets 11 adapted to freely embrace the side legs of the other frame section.

The legs 8a of the frame section 6a may be fitted at their lower or outer ends with guide clips 12 extending around, or partially around, the legs 8b of the frame section 6b and having clamping screws 13 whereby the frame sections may be held against telescopic movement in any of their adjusted positions. The frame section 6b may have at its lower end a forwardly extending transverse rail 6c to assist in supporting a bag or the like thereon.

The frame is adapted to be swung upwardly about its axis 4 by mechanism operated from the engine of the vehicle to which it is applied. This mechanism may be of any suitable form and as shown may include a toothed wheel 16 free on the axle 4 and meshing with a toothed pinion 17 carried by a shaft 18 which is also fitted with a worm wheel 19 driven by a worm 21, the worm shaft 22 being fitted with a pulley 23 to receive a driving belt adapted to be driven by the engine in any suitable manner.

The aforesaid shafts 18 and 22 may be supported by a suitable casing 24 secured to the bracket 2 and providing a housing for the worm 21 and worm wheel 19. Other means may obviously be provided to obtain the necessary speed reduction between the engine and the swinging frame.

Means are preferably provided to automatically connect the frame to the power mechanism when a bag to be loaded is placed upon the frame, and an automatic release or trip device may be arranged to free the frame from said mechanism when the former has been swung upwardly through a predetermined arc.

Figure 2:
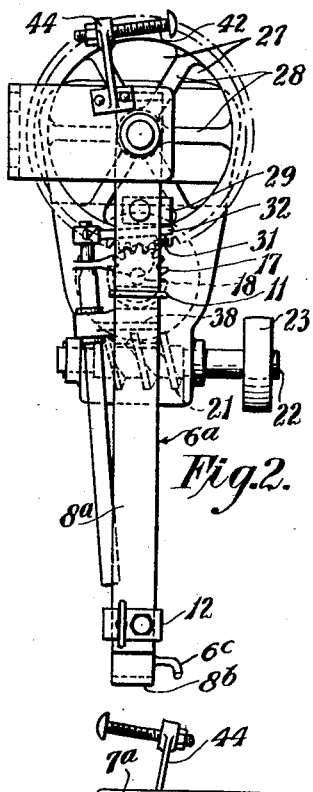
Figure 2 is a side view.
Figure 3:
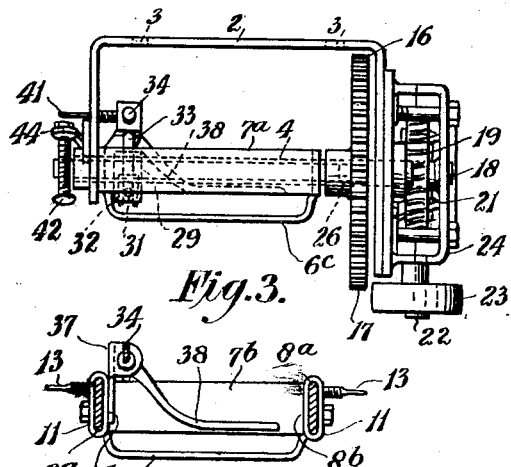
Figure 3 is a plan view.
Figure 4:
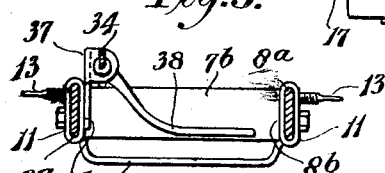
Figure 4 is a sectional plan taken on the line IV—IV in Figure 1.

Accordingly a sliding bolt or pin 26 may be supported by, and adapted to extend transversely of, the frame section 6a and project at each side thereof. The sliding bolt may be aligned either with a series of circumferentially spaced pockets 25 formed in said toothed wheel 16 as in Figure 6, or with the spaces 27 between the spokes 28 thereof as in Figure 2. The bolt 26 may have a collar 29 attached thereto and provided with a stem 31 adapted to be embraced by the forked end 32 of a lever 33 fixed to and outstanding from the upper end of a rod 34, which extends longitudinally of the frame at the rear and near one side thereof. This rod may be rotatably supported by brackets 36, 37 attached to adjacent legs of the frame sections 6a, 6b. An arm 38 is connected to said rod 34, and under normal conditions i. e. when the frame has no bag thereon, the arm projects transversely at or adjacent the front of the frame as seen in Figures 3 and 4. A boss 39 at the inner end of the arm has a vertical passage preferably of square or flat sided shape in cross section to freely accommodate the rod 34 the lower portion of which is similarly shaped. The boss 39 fits rotatably within bearing passages of the bracket 37. Thus the rod 34 will rotate or turn with the arm 38, whilst the latter and the bracket 37 may slide along the rod during telescopic movement of the frame section 6b. The broken lines in Figure 1 indicate the frame section 6b, with the bracket 37 and arm 38 in an extended position.

Figure 5:
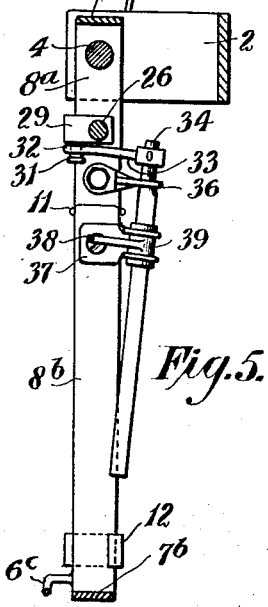
Figure 5 is a sectional elevation taken on the line V—V in Figure 1.

A suitable catch may be provided to prevent any swinging of the frame when the vehicle is travelling and when the apparatus is not being used. In such circumstances the frame sections 6a, 6b will be in a closed or nonextended position as seen in Figures 1, 2 and 5.

Figure 6:
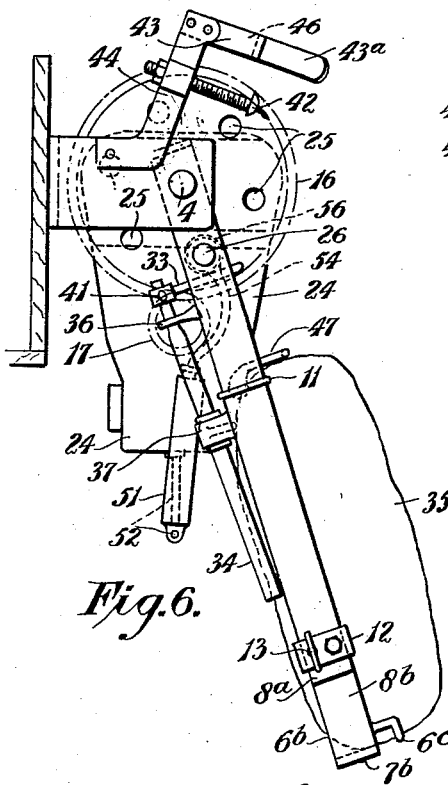
Figure 6 is a side view of the loader in use with a bag thereon ready to be loaded.
Figure 7:
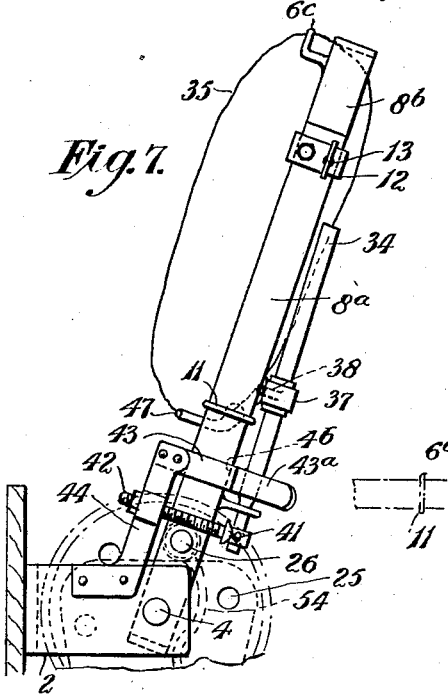
Figure 7 is a side view in which the loader with bag thereon has been swung upwardly from the position shown in Figure 6.

When a bag 35 is placed upon the frame as in Figures 6 and 7 the bag bears upon the arm 38, which may constitute a top support for the bag, and depresses same thus causing the rod 34 and the forked lever 33 to turn or partially rotate so that the sliding bolt 26 is moved into one of the aforesaid pockets 25 or the spaces 27 between the spokes of the toothed wheel 16. The frame is thereby operatively connected to the power mechanism by which it is swung upwardly through the desired arc about the axle 4 so that the bag is elevated and may then fall from the frame into the vehicle.

In order to automatically disconnect the frame from the power mechanism when the former has been swung upwardly through a predetermined arc, the aforesaid lever 33 may have a projection or striker 41 adapted to engage a stop 42 and thus automatically retract the sliding bolt 26 from the toothed wheel 16 at an appropriate period, whereupon the frame will fall back by gravity into a position to receive the next bag to be loaded. The stop 42 may be adjustable and consist of a screw as shown, so that it may be set to disconnect the power mechanism at any desired period of the swinging movement of the frame. The striker and stop may be arranged to engage each other when the lifting frame is in about a vertical position.

Figure 8:
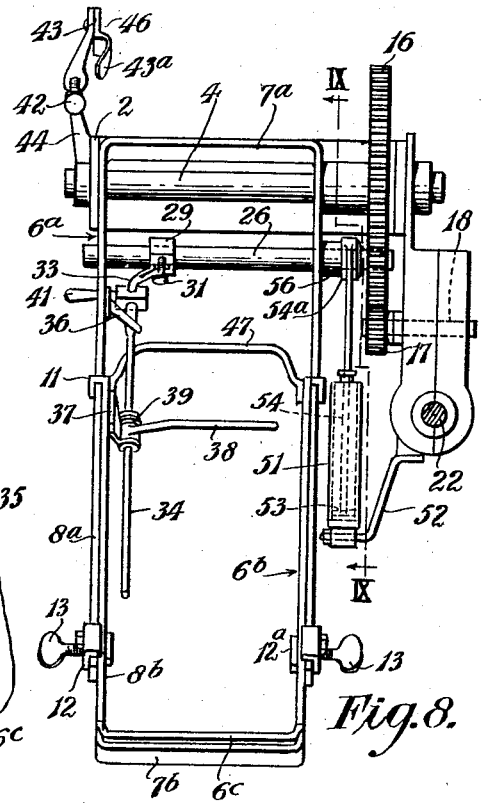
Figure 8 is a front view of Figure 6, the bag being omitted.

In case it should not be desired for the bags to be thrown off the frame 6 when it has been raised, we may provide a suitable catch 43 (Figures 6, 7 and 8) adapted to hold the raised frame in a suitably inclined attitude so that a bag will remain thereon until it has been lifted off by an operative. The catch 43 may consist of a spring arm attached at one end to a bracket 44 supporting the stop 42, the arm having a bend which forms a shoulder 46 against which the adjacent leg of the frame section 6a may rest as in Figure 7. As the frame approaches the limit of its upward travel it engages the outer end portion 43a of the spring arm, which may be curved outwardly, and slips in against the shoulder 46 at the same time as the sliding bolt 26 is retracted from the toothed wheel 16 by the action of the striker 41 and the stop 42. The frame is thus supported in the attitude shown in Figure 7, and the bag 35 may be removed when the operator or stacker is ready. An arm 47 may extend across the frame section 6b in order to support the bag when the frame is in a raised position. When the raised bag has been removed, the operator may release the catch 43 from the frame which then falls by gravity.

Means are also provided to check the return action or falling of the frame 6 so that it will not make violent impact with the ground. A spring or a buffer may be employed for this purpose, but according to the arrangement illustrated in Figures 6 to 10 an air brake or dash pot device is provided.

Figure 9:
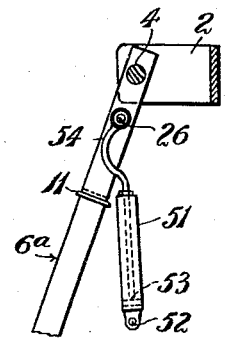
Figures 9 and 10 are reduced diagrammatic views taken approximately on the line IX—IX in Figure 8 and illustrating the action of a check device for preventing too sudden return of the swinging frame.
Figure 10:
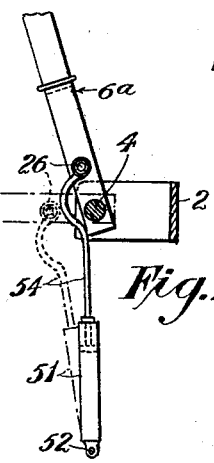

This device may include a cylinder 51 supported at its bottom by a rod 52 attached to a suitable stationary part, so that the cylinder may swivel. A plunger 53 works within the cylinder and has its rod 54 connected to the frame section 6a. This connection may include an apertured boss portion 54a at the upper end of the rod 54 adapted to fit rotatably around a lug 56 of the frame section 6a through which lug the aforesaid bolt 26 may slide. The cylinder may be provided with an appropriate port or ports so that during the upward swinging of the frame there is no resistance to the outward movement of the plunger. During the return motion of the frame, however, the escape of air from the cylinder in front of the plunger 53 is restricted by its outlet port, so that a gentle descent of the swinging frame is ensured. If desired the upper portion of the plunger rod may be curved to prevent it from fouling the shaft 4 when the frame is raised. Various positions of the frame and the air brake or dash pot device are indicated in Figures 9 and 10.

Having now described our invention what we claim as new and desire to secure by Letters Patent is:—

1. A loading device for automobile vehicles, comprising a bracket for attachment to a vehicle, an axle supported horizontally on said bracket, a frame adapted at its inner ends to swing around said axle, a rotary member on said axle, mechanism for transmitting motion from the automobile engine to said rotary member, a bolt slidable on said frame, means operable by the placing of a load upon said frame to automatically engage said bolt with said rotary driving member, and means adapted to automatically retract said bolt from the driving member when said frame arrives at a load discharging position.

2. A loading device for automobile vehicles, comprising a bracket for attachment to a vehicle, an axle extending horizontally of said bracket, a frame adapted at its inner end to swing about said axle, a wheel on said axle, reduction gearing operable by the automobile engine for driving said wheel, said wheel being provided with circumferentially spaced recesses, a bolt slidable on said frame, means engageable by the placing of a load upon said frame to thereby automatically move said bolt into one or other of the recesses of said wheel, and means adapted to automatically retract said bolt from said wheel when said frame has been swung upwardly into a load discharging position.

3. A loading device for automobile vehicles, comprising a bracket for attachment to a vehicle, an axle extending horizontally of said bracket, a frame adapted at its inner end to swing about said axle, a wheel on said axle, reduction gearing operable by the automobile engine for driving said wheel, said wheel being provided with circumferentially spaced recesses, a bolt slidable on said frame, means engageable by the placing of a load upon said frame to thereby automatically move said bolt into one or other of the recesses of said wheel, a trigger for said bolt, and a stop disposed in the path of said trigger to cause said bolt to be withdrawn from the wheel when said frame has been swung upwardly through a predetermined arc.

4. A loading device for vehicles including a driven element, a load-carrying frame mounted for swinging movement, means including a transverse bar adapted to cooperate with the driven element on the frame for connecting the frame and element to compel the frame to be operated by the element for movement from a loading to a discharge position, and a member carried by the frame connected to the transverse bar and operated by the article placed on the frame to actuate said means.

5. A loading device for vehicles including a driven element, a frame mounted for free swinging movement with respect to said element, a transversely mounted member carried by the frame for connecting the frame to the element to compel responsive movement of the frame in the operation of the element, and an actuator connected to the transversely mounted member and arranged on the frame in the path of the article to be supported thereon and operated in the positioning of said article to actuate said member to connect the frame and element.

6. A loading device for vehicles including a driven element, a frame mounted for free swinging movement with respect to said element, a transversely mounted member carried by the frame for connecting the frame to the element to compel responsive movement of the frame in the operation of the element, an actuator connected to the transversely mounted member arranged on the frame in the path of the article to be supported thereon and operated in the positioning of said article to actuate said member to connect the frame and element, a stop, and means, on the actuator arranged to engage the stop at one limit movement of the frame to disconnect the transversely mounted member from the element to thereby free the frame from the influence of the element.

7. A loading device for vehicles including a driven element, a skeleton frame mounted for free movement with respect to the element, a member carried by the frame and movable transversely thereof to connect or disconnect the frame and element, a rod carried by the frame for operating the member, and an actuator for the rod arranged to be engaged and moved to actuate the rod in the placing of an article on the frame.

8. A loading device for vehicles including a driven element, a skeleton frame mounted for free movement with respect to the element, a member carried by the frame and movable transversely thereof to connect or disconnect the frame and element, a rod carried by the frame for operating the member, an actuator for the rod arranged to be engaged and moved to actuate the rod in the placing of an article on the frame, and a trip arranged to engage and actuate the rod to disconnect the member from the element when the frame has reached one limit of movement.

9. A loading device for vehicles including a driven element, a skeleton frame mounted for free movement with respect to the element, a member carried by the frame and movable transversely thereof to connect or disconnect the frame and element, a rod carried by the frame for operating the member, an actuator for the rod arranged to be engaged and moved to actuate the rod in the placing of an article on the frame, and an adjustable trip arranged to engage and actuate the rod to disconnect the member from the element when the frame has reached one limit of movement.

10. A loading device for vehicles including a driven element, a skeleton frame mounted for free movement with respect to the element, a member carried by the frame and movable transversely thereof to connect or disconnect the frame and element, a rod carried by the frame for operating the member, an actuator for the rod arranged to be engaged and moved to actuate the rod in the placing of an article on the frame, a trip arranged to engage and actuate the rod to disconnect the member from the element when the frame has reached one limit of movement, and means to engage and hold the frame at one limit of movement following disconnection of said member from said element.

11. A loading device for vehicles including a shaft mounted on the vehicle, means for driving said shaft, a frame mounted for free swinging movement on the shaft, a slidable member carried by the frame and operative to connect or disconnect the frame relative to the shaft driving means, and a rod mounted on the frame and connected to the slidable member, an arm extending from the rod across the frame and operated by the article to be placed on the frame to actuate said slidable member to connect the frame and shaft driving means, whereby the frame is elevated from a loading position to a discharge position.

12. A loading device for vehicles including a shaft supported on the vehicle, a driven gear connected to said shaft for operating the same, a frame mounted for free swinging movement with respect to the shaft, a bar carried by the frame to be moved into and out of connection with the gear to cause the frame to move about the shaft in the movement of the gear, a member carried by the frame for operating the shaft, and an element connected to said member to be actuated by the article placed on the frame for moving said bar into cooperation with said gear.

13. A loading device for vehicles including a shaft supported on the vehicle, a driven gear connected to said shaft for operating the same, a frame mounted for free swinging movement with respect to the shaft, a bar carried by the frame to be moved into and out of connection with the gear to cause the frame to move about the shaft in the movement of the gear, a member carried by the frame for operating the shaft, an element connected to said member to be actuated by the article placed on the frame for moving said bar into cooperation with said gear, and means to operate the member at one limit movement of the frame to disengage the bar from the gear.

In testimony whereof we affix our signatures.

HENRY FREDERICK DEUTSCHER.
JOHN CHAPMAN BOLTON.